F. G. LE MERLE, M. J. ULLMAN, AND J. E. BARRY.
GASOLINE-ELECTRIC AUTOMOBILE.
APPLICATION FILED SEPT. 14, 1920.
1,423,124.
Patented July 18, 1922.
3 SHEETS—SHEET 1.
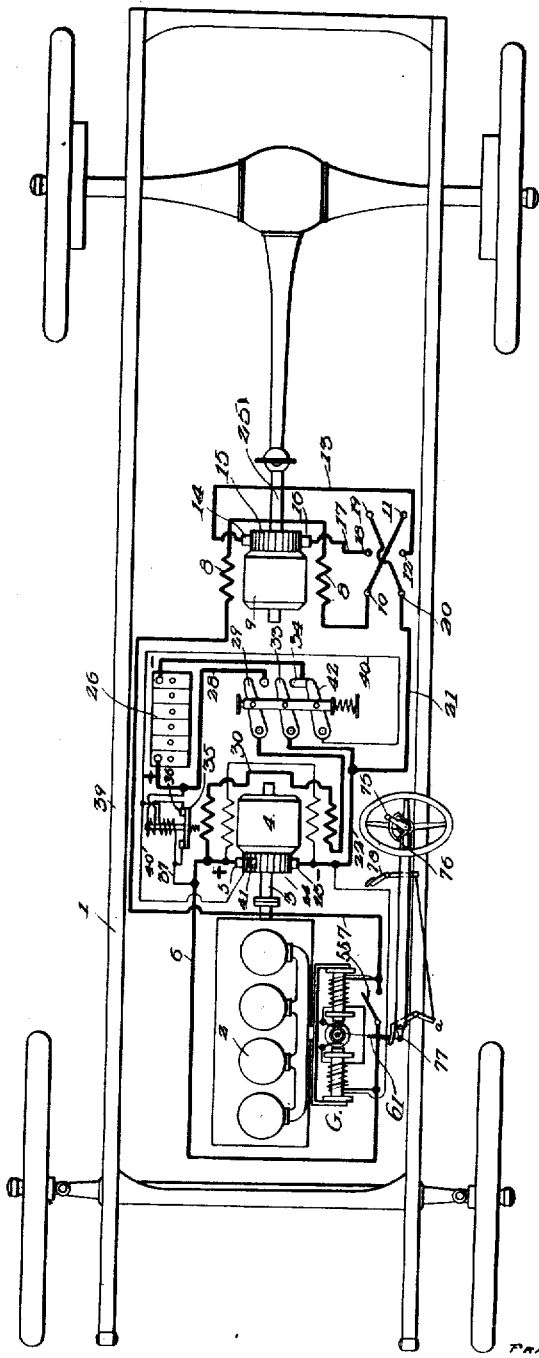
WITNESSES
J. F. Schrott
INVENTORS,
FRANCIS GLOYD LE MERLE,
MERVIN JEAN ULLMAN,
JOHN EMMET BARRY,
BY
ATTORNEYS

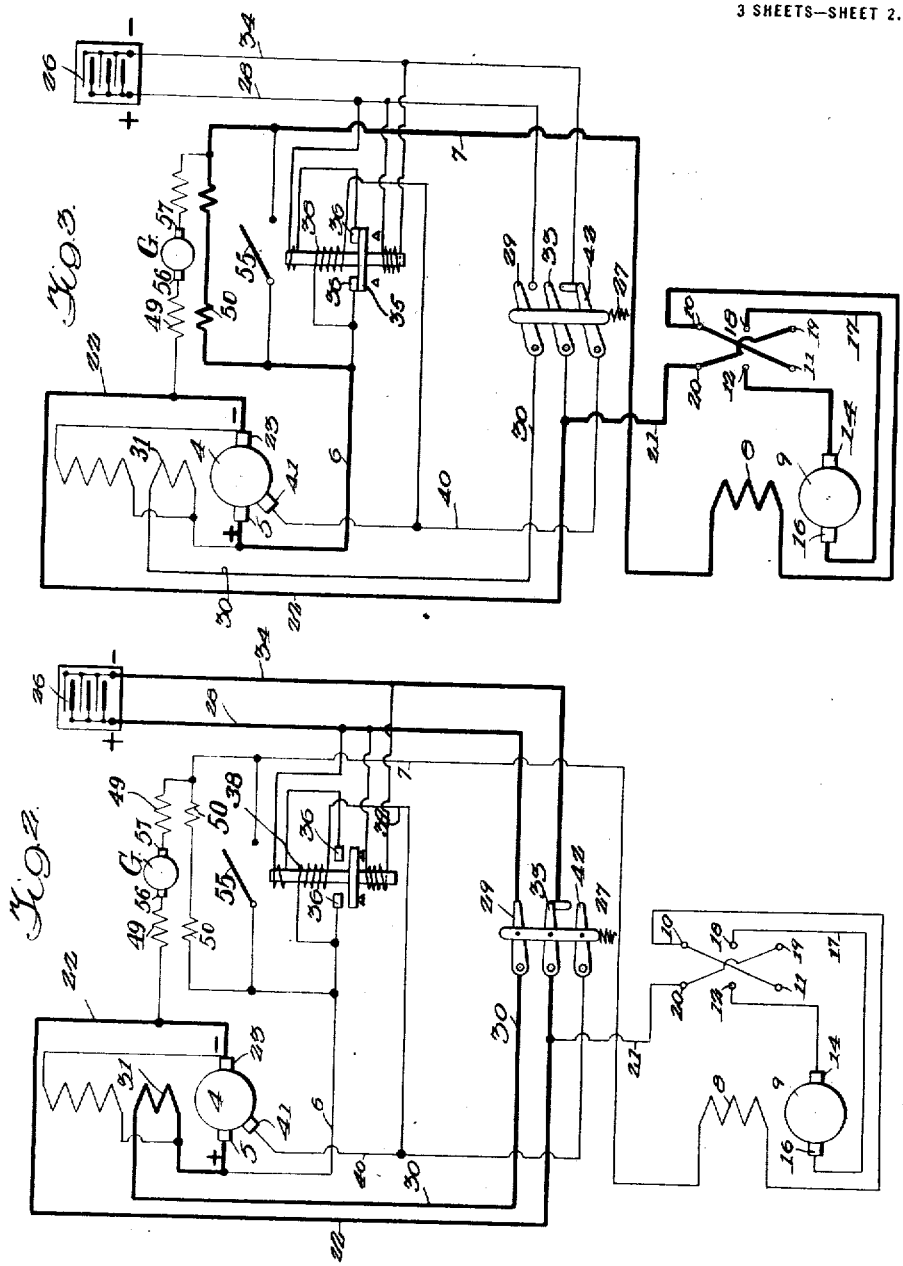

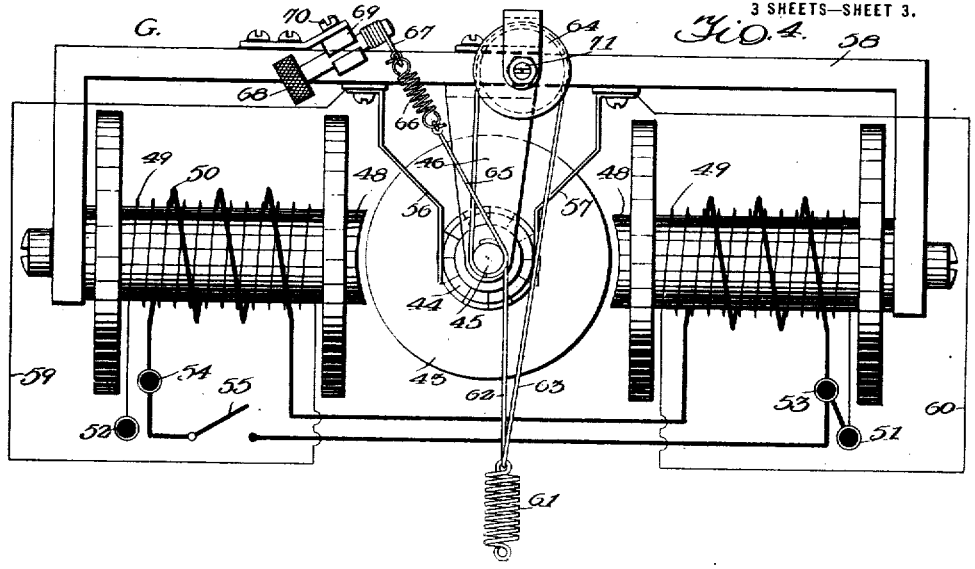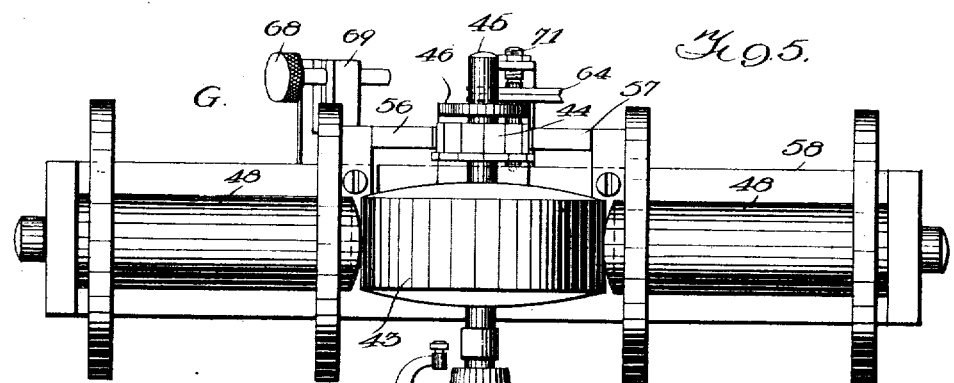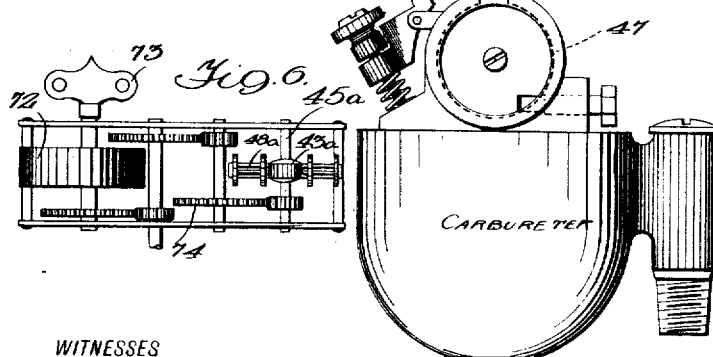

UNITED STATES PATENT OFFICE.

FRANCIS GLOYD LE MERLE, MERVIN JEAN ULLMAN, AND JOHN EMMET BARRY, OF WASHINGTON, DISTRICT OF COLUMBIA.

GASOLINE-ELECTRIC AUTOMOBILE.

1,423,124.    Specification of Letters Patent.    Patented July 18, 1922.

Application filed September 14, 1920. Serial No. 410,188.

*To all whom it may concern:*

Be it known that we, FRANCIS GLOYD LE MERLE, MERVIN JEAN ULLMAN, and JOHN EMMET BARRY, citizens of the United States, and residents of Washington, in the District of Columbia, have invented certain new and useful Improvements in Gasoline-Electric Automobiles, of which the following is a specification.

Our invention relates to improvements in motor vehicles, especially being an improvement in automobiles, and it consists in the constructions, combinations and mode of operation herein described and claimed.

One of the foremost objects of the invention is to provide a driving apparatus for an automobile or the like, from which the power is imparted directly to the rear axle without the interposition of the customary transmission, clutch, etc. and the difficulties attendant upon their use.

A further object of the invention is to provide a power plant for an automobile which will operate at full efficiency at all times, regardless of the speed at which the vehicle is traveling or the grade it is ascending.

A further object of the invention is to provide a power plant of the class described, in which is incorporated an ingenious governor which causes the vehicle to travel at a uniform rate of speed, after a proper adjustment for a desired speed has been made, regardless of whether the vehicle is traveling a level stretch or an incline.

A further object of the invention is to provide a power plant embodying an internal combustion engine and an electric generator, the latter being so wound that it may be operated as a starting motor for the engine.

A further object of the invention is to provide an automatic control, dependent on the terminal voltage of a driven motor.

Other objects and advantages will appear in the following specification, reference being had to the accompanying drawings, in which:—

Figure 1 is a plan view of the chassis of an automobile, diagrammatically illustrating the improved gasoline-electric power plant thereon.

Figure 2 is a diagram illustrating the passage of current in heavy lines over the wiring system, in the starting position, Figure 3 is a similar wiring diagram illustrating the passage of current in heavy lines in the running position, Figure 4 is a plan view of the governor by means of which uniform rates of speed are derived regardless of whether the vehicle is running uphill or on the level, Figure 5 is a side elevation of the governor, illustrating its attachment to the carbureter, and Figure 6 is a detail view of a modification of the governor wherein a spring motor is employed as is more fully disclosed below.

As briefly pointed out in one of the objects of the invention above, this automobile power plant is distinctive in that the usual transmission gearing, clutch, etc. are entirely eliminated. In other words, the power generated at the front is directly imparted to an electric motor in connection with the rear axle, and there is no intermediate mechanism to absorb energy and cause endless difficulties by breaking down. The advantages of the improved power plant, become apparent as the description of the construction and mode of operation proceeds. The chassis 1, which incidentally, may be that of the ordinary automobile or other vehicle, carries the usual internal combustion engine 2 at the front. Its shaft 3 is common both to the engine and special wound electric generator 4.

Assuming, for the sake of a quick introduction, that the parts in Figure 1 are in the running position, current flows from the positive brush 5 of the generator, over wire 6, through the governor G, wire 7, through the coils 8 of the driving motor 9, terminals 10, 11 and 12 of the reversing switch, wire 13 to the upper brush 14, through the commutator 15 and armature windings to the lower brush 16, over wire 17 and the terminals 18, 19 and 20 of the reversing switch, wires 21 and 22 to the negative brush 23, bearing on the commutator 24 of the generator.

The generator 4 creates direct electric current. The driving motor 9 is series wound. The internal combustion engine 2 operates in the usual manner, in turn causing the operation of the generator 4 and the current which is created operates the driving motor 9 so that the rear axle and wheels of the automobile are revolved, through the driving shaft 25 of the motor.

For the purposes of the description immediately following, consider diagrammatic Figures 2 and 3. These respectively shown the starting and running positions, the passage of the main current being indicated by heavy lines. There is a small storage battery 26, ordinarily used for lighting and ignition, but chiefly to start the engine 2. It is at such time that the generator 4 becomes the starting motor.

When the 3-pole switch is depressed into the position shown in Figure 2 against the tension of its expansion spring 27, current flows from the positive pole of the storage battery over wire 28 and arm 29 of the switch to the wire 30; from thence through the series winding 31 of the generator, in at brush 5, out at brush 23, a small portion passing through the shunt winding of the generator which is shunted across brushes 5 and 23, over wire 22 to the middle arm 33 of the switch, returning to the negative pole of the storage battery via wire 34. The current from the storage battery thus causes the generator to operate as a compound motor and thus start the engine 2.

Next assume the running position in Figure 3. The starting or 3-pole switch is now released, so that the arms assume the second position illustrated. The generator 4 now operates as such, the current path being as indicated in heavy lines and already fully described in connection with Figure 1. By releasing the 3-pole switch, the storage battery 26 is disconnected from the series winding 31 of the generator. This winding is used only in starting the engine.

Provision is made for charging the storage battery while the engine and generator run. As soon as the voltage of the generator reaches a predetermined value, the reverse current circuit breaker 35 bridges the contacts 36 so that current is conducted to the battery from the positive brush 5. Before this value is reached, current flows from the positive brush 5 over wire 6, through the coil 38, wire 39, over wire 40 and back to the commutator of the generator through the third brush 41, which is adjustable in position.

After the voltage of the generator builds up high enough to sufficiently energize the coil 38 for the attraction of the core of the circuit breaker 35, the contacts 36 are bridged as stated above, whereupon current flows from the brush 5, over wire 6, over contacts 35 and 36 to the wire 28, through the storage battery 26 returning via wire 34, arm 42 of the 3-pole switch, wire 40 and third brush 41. The circuit breaker 35 remains closed, or in the charging position, while the power plant of the automobile is in operation. As soon as the engine 2 is stopped or travels at an extremely low speed, the circuit breaker 35 automatically opens so that the current from the storage battery may not flow back through the generator and thus be wasted.

The governor G, or automatic voltage regulator is equal in importance to the main power plant, since through its instrumentality the necessary changes in voltage at the series driving motor 9 are accomplished and this by the variation of the applied terminal voltage; not by the insertion of wasteful resistance in the circuit. It is to be borne in mind that the voltage impressed on the driving motor does change in accordance with the condition of the road which the vehicle traverses. If the road is extremely rough or on an incline, the governor causes the throttle valve 47 to open wider, thus causing the engine 2 to work harder and produce a greater voltage and current output at the generator 4 so that the motor 9 may operate to drive the vehicle at the same speed that it was driven before the road conditions named were reached.

Consider Figure 4, which illustrates the governor and its windings in detail, in connection with Figure 1, which shows the governor in place in the line wire 6, 7. It comprises the drum armature 43, which although not so shown is actually provided with suitable windings which are connected to the various segments of the commutator 44.

The armature shaft 45 is freely revoluble in suitable bearings such as 46, and extending down as shown in Figure 5, connected with the shaft of the butterfly or throttle valve 47. The field poles 48 contain shunt windings 49 and series windings 50, both separate and distinct from each other. The winding 49 is in series with the armature of the governor, but is in parallel with the motor terminals 7 and 21, while the field winding 50 is in series with current supplied to the motor.

One of the terminals 51 of the shunt connected winding is connected to terminal 53 which is one of the terminals of the series connected winding which is connected to the external load at the main wire 7.

The opposite terminal 52 of the shunt winding being connected to the negative terminal of the generator, the terminal 54 being the other terminal of the series winding is connected to the main wire 6 which is connected to the positive terminal of the generator, all being illustrated in Figure 1.

There is a single-pole single-throw knife switch 55 connected across the terminals 53, 54, for the purpose of cutting out the series windings when necessary. Brush contacts 56, 57, mounted on the field frame 58 but properly insulated therefrom, bear on the commutator 44 and have the inner ends of the shunt windings 49 connected thereto through wires 59 and 60.

A coil spring 61 has two cable connections 62, 63 extending to the shaft 45, one running directly but the other passing over an idler 64 for the purpose of equalizing the tension of the spring on the armature shaft. Both cables tend to turn the shaft in one direction, namely, clockwise. A third cable 65 extends from the armature shaft to a coil spring 66, the other end of which includes a flexible connection 67 wound on the end of the torsion screw 68.

This screw is so mounted in a bracket 69 that it may either be loosened or clamped tight, by properly turning the screw 70. The spring 66 and its connections, exert a counter clockwise rotational force on the armature shaft, thus opposing the spring 61. The pivot screw 71 of the idler 64, is adjustable and capable of being locked to its adjustment, for the purpose of making the idler run with just the proper amount of play.

The method of operation and adjustment of the governor is as follows: First, the spring 61 is relieved of all tension. The lock screw 70 is then loosened sufficiently to allow a stiff movement of the torsion screw 68. This screw is manipulated until the tension spring 66 pulls strongly enough to close the throttle valve 47 from a wide open position. The armature 43 will accomplish this by rotating through an angle of 90°, whereupon the lock screw 70 should be set to clamp the torsion screw 68 permanently in position. The reader must bear in mind that the spring 66 is now under tension. The spring 61 is next stretched until it overcomes the tension of the spring 66, or approximately enough to open the throttle valve 47 about 5°.

Upon starting the engine 2, the operator will note should he connect a voltmeter across the generator terminals that the generator 4 is building up. This will require but a few seconds. The tension of the spring 61 should be adjusted until the generator voltage is about ten volts. No voltmeter is shown in the drawings, but the reader will understand at once what the operation is like.

There is now the condition that the tension of the spring 61 is balancing the torque of the armature 43. If the line switch which is the reverse switch is now closed for the forward running and the vehicle brought up to a speed of say ten miles per hour on a level road, we now have the same condition as we had before we started, the tension of the spring 61 balancing the torque of the armature 43. If now a 5% grade is approached in order to ascend the grade at the same rate of speed as on level, the generator 4 must supply more voltage and current to the motor driving the vehicle, the govenror G now does this by coming into action and opening the throttle valve 47 which supplies the engine 2 with more gas thus causing it to speed up, which drives the generator 4 at an increased speed, this causing its voltage to rise to a higher value as noted on the voltmeter, which supplies the necessary current to the motor to enable it to carry the vehicle up the grade at the same speed it was traveling on level.

This voltage regulation occurs solely through the governor G and in this manner: When the vehicle is running on level, the torque produced by the spring 61 will be neutralized by the torque produced by the armature 43. As the vehicle starts to ascend a grade, the motor immediately draws more current from the generator 4 which causes a drop in voltage across its terminals which in turn decreases the current through the shunt windings 49 and armature 43 of the governor G. There is also an increase in current through the series windings 50 in a direction opposite to that of the current in the shunt windings 49 which still further weakens the field produced by the shunt windings 49. Thus the torque produced by the armature 43 is weakened allowing the torque produced by the spring 61 to rotate the armature in a clockwise direction, thus opening the throttle valve 47 until a state of equilibrium is again restored between the torque produced by the armature 43 and the spring 61. The series winding 50 is shunted out by the single-pole single-throw switch 55 when it is necessary to have the governor G maintain a constant voltage with varying loads.

Manual operation of the throttle 47 is had through the lever 75, which moves over the quadrant 76 and has a connection 77 to the free end of the spring 61. The quadrant 76 is graduated in miles per hour, so that all the operator needs to do is to set the lever 75 at the place registering the desired speed, whereupon the mechanism of the power plant performs its functions in such a manner as to keep the speed of the vehicle practically in correspondence with that registered on the quadrant.

The usual foot and hand brakes are intended to be used but are not illustrated in the drawings since their arrangement is obvious. It is also intended that there shall be an accelerator 78 for stretching the spring 61, or in other words, opening the throttle 47, independently of the throttle lever 75, in cases where sudden bursts of speed are required.

The modification in Figure 6, illustrates a different method of applying spring tension to the armature shaft 45ª. In this case, it is done by a spring motor 72, capable of being wound by the key 73 or other suitable means and the intervening gear train 74. Tension of spring 72 is capable of being released when necessary, by suitable mechanical means.

There is the same arrangement of field poles 48ª at the sides of the armature 43ª as before. The same result is obtained by this arrangement as by that in Figure 4. The tension of the spring 72 opposes the torque created in the armature by the field across the poles 48ª and when the latter become weakened, the spring exerts its force to open the throttle valve in proportion.

The advantages may be briefly recited, in addition to the above description. It is contemplated that the power plant of this particular automobile is to be put to uses to which the power plants of automobiles such as now known, cannot be put. The chassis 1 may be fitted with any type of body so as to transform the vehicle in to a portable motion picture projection outfit, a portable hospital or X-ray outfit, a wireless telegraph station, etc.

In each case, current is derived from the generator 4, and the reader may easily see that the applications of the current derived are unlimited. For example, a searchlight may be operated, or the device may be used as a portable lighting station for camps and the like. Although the governor G is an indispensable part of the power plant, its use is not limited to that in connection with the engine 2. It may be employed on any type of prime mover, operating a generator, the current from which actuates the governor suitably modified to control the throttle of the prime mover, such as is shown in Figure 6. While this generator resembles a compound wound generator, it is never used as a compound generator but as a shunt generator and a compound motor. It is at all times run as a shunt generator when generating. It has a winding, however, which is in series with the armature and when used as a motor for starting the engine, it is a compound motor.

While the construction and arrangement of the improved power plant as herein described and claimed, is that of a generally preferred form, obviously modifications and changes may be made without departing from the spirit of the invention or the scope of the claims.

We claim:

1. A power plant, comprising an electric generator, with a driving engine having a valved fuel inlet, a motor embraced by the generator circuit, operating a driving member; and a governor controlling the fuel inlet to maintain a varying generator output and the speed of said member at a predetermined normal, comprising means under tension pulling on the valve in one direction, electro-magnetic means embraced by said circuit producing torque to balance the tension of the first means at a predetermined point, but permitting the first tension means to open the valve farther when said torque decreases, and manually operated means working over a scale graduated in miles per hour, for varying the tension of said first means to correspondingly vary the normal speed of the driving member.

2. A power plant for vehicles, comprising an engine with a throttle, a generator driven by the engine, a motor driven by the generator, a governor including a winding in connection with the generator terminals to produce a field, an armature in said field, exerting a closing torque on the throttle, by which it is carried, means exerting an opening torque on the throttle balancing that of the armature; and manually operated means for varying the opening torque of said last means to set the speed at which the vehicle is to travel over any surface.

3. A power plant for vehicles, comprising an engine with a throttle, a generator driven by the engine, a motor driven by the generator, a governor including a winding in connection with the generator terminals to produce a field, an armature in said field, exerting a closing torque on the throttle by which it is carried, resilient means exerting an opening torque on the throttle, balancing that of the armature; and a lever with a connection to said resilient means, manually adjustable over a scale graduated in units of vehicle speed, for varying the opening torque of said resilient means thus causing a corresponding output by the generator to effect a torque-equilibrium on the governor armature.

4. A power plant for vehicles, comprising an engine with a throttle, a generator driven by the engine, a motor driven by the generator, a governor including a winding in connection with the generator terminals to produce a field, an armature in said field exerting a closing torque on the throttle by which it is carried, resilient means with a connection to the armature, augmenting the influence of said field; second resilient means exerting an opening torque on the throttle, initially overcoming the tension of the first resilient means and balancing the torque of the armature, and a lever with a connection to said second resilient means, manually adjustable over a scale graduated in units of vehicle speed, for varying the opening torque, of said second resilient means, thus causing a corresponding output by the generator to effect a torque-equilibrium on the governor armature.

5. The combination with a prime mover and generator apparatus, of a series motor connected thereto, and a regulator comprising a throttle valve for the prime mover, a torque motor connected thereto, comprising an armature and field winding connected in series and across the generator terminals, and an auxiliary field winding connected in series with the generator.

FRANCIS GLOYD LE MERLE.
MERVIN JEAN ULLMAN.
JOHN EMMET BARRY.